UNITED STATES PATENT OFFICE.

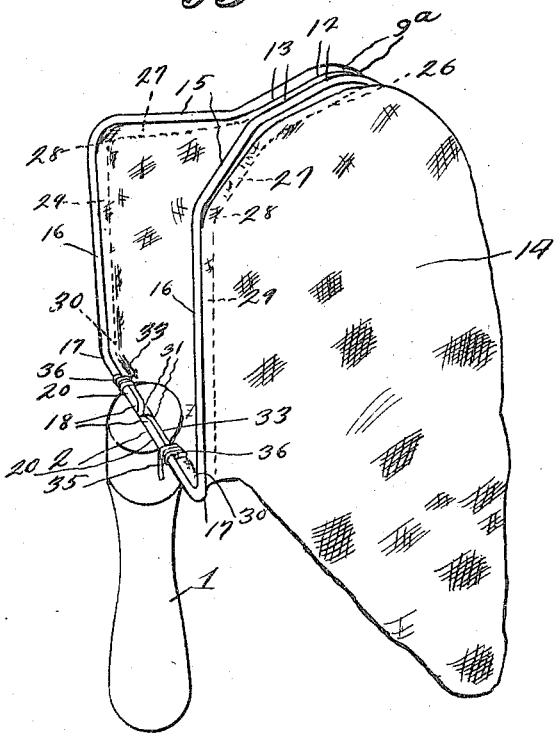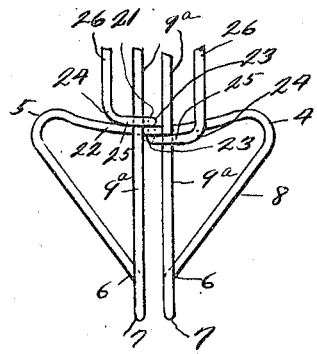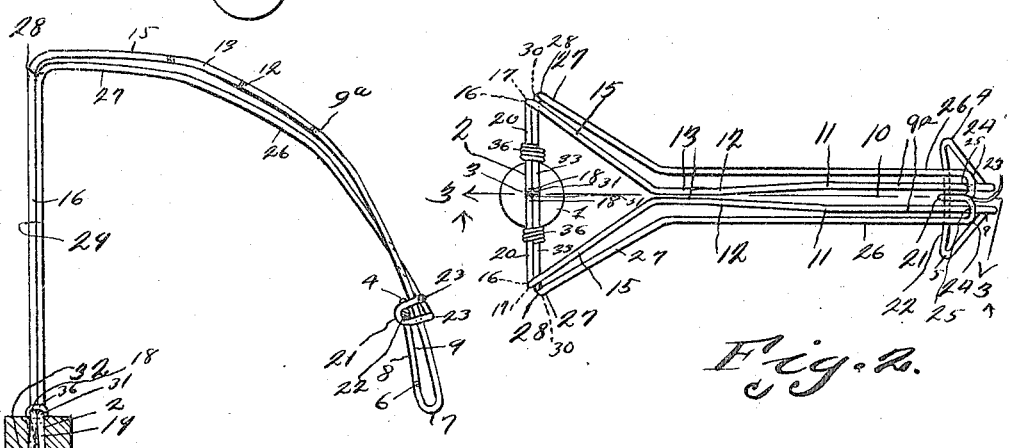

CONSTANT L. DUHEM, OF OROVILLE, CALIFORNIA.

FRUIT-GATHERER.

1,264,780.                     Specification of Letters Patent.     Patented Apr. 30, 1918.

Application filed December 20, 1917.   Serial No. 208,046.

*To all whom it may concern:*

Be it known that I, CONSTANT L. DUHEM, a citizen of the United States, residing at Oroville, in the county of Butte, State of California, have invented a new and useful Fruit-Gatherer; and I do hereby declare the following to be a full, clear, and exact description of the invention, such as will enable others skilled in the art to which it appertains to make and use the same.

This invention relates to an improved gatherer for picking or gathering fruit, more particularly olives and the like, and one of the objects of the invention is the provision of a device of this kind having yieldable wire jaws highly polished, or possibly nickel plated, thereby avoiding scarring the bark of the stem of the olive or the like.

A further object of the invention is to provide an improved gatherer provided with a pair of yieldable jaws, constructed from a single length of spring wire, said jaws having diverging portions forming an entrance mouth for the stem of the olive or the like.

A further object of the invention is to provide a bag for catching the olives or the like gathered, and the provision of a frame constructed from a single length of spring wire, for supporting the bag.

A further object of the invention consists in the provision of link connections between the bag holding frame and the jaw frame, thereby steadying the two frames relative to each other.

A further object of the invention is the provision of means for attaching the two frames firmly to a suitable handle.

In practical fields the details of construction may necessitate alterations falling within the scope of what is claimed.

The invention comprises further features and combination of parts as hereinafter set forth, shown in the drawings and claimed.

In the drawings:—

Figure 1 is a view in perspective of the improved olive picker or gatherer constructed in accordance with the invention.

Fig. 2 is a plan view of the olive picker or gatherer showing the bag removed.

Fig. 3 is a sectional view on line 3—3 of Fig. 2.

Fig. 4 is an enlarged detail view of the link connection between the two frames, the bag supporting frame and the jaw frame.

Referring more especially to the drawings 1 designates a suitable handle, which is provided with a groove 2 in one end, and the bottom of the groove has a socket 3. To form the olive picking jaws a piece of spring wire is bent upon itself at 4, 5, 6 and 7, to form a substantially triangular loop 8. The opposite sides of the wire beyond the bends 7 are curved in the general form shown, to form the opposite jaws $9^a$. These jaws as shown in plan view in Fig. 2 are spaced their greater portions as shown at 10, and from the points 11 the jaws converge toward each other to the points 12, from where the jaws are spaced closer together for a short distance than the space 10 thereby constructing the jaws with biting parts 13, which, as the stem passes therebetween, act to bite and detach the stem, so that the olive or the like may drop into a suitable supporting bag 14. The jaws 9 beyond the biting parts diverge and these diverging portions 15 constitute the opposite sides of an entrance mouth for the reception of the stem of the olive. Beyond the diverging portions 15 the jaws merge into the opposite parallel parts 16, which are bent at 17 and 18, and terminate into the shanks 19, which engage the socket 3. The portions 20 between the bends 17 and 18 nearer the bends 18 engage the transverse groove 2 of the handle thereby bracing and insuring rigidity for the anchored ends of said jaws $9^a$. To form a bag supporting frame, a single length of spring wire is bent upon itself to form a loop 21, through which the transverse part 22 (which is slightly curved) of the triangular loop 8 engages. This loop 21 passes between the jaws 9 adjacent the triangular loop 8, and beyond the loop proper, the sides of the loop are bent, at 23 and 24, thereby forming the parts 25, which transversely overlie the jaws $9^a$ adjacent the transverse part 22 of the triangular loop, thereby assisting in holding and guiding the jaws during their spreading actions. The sides of the bag holding frame beyond the bends 24 are curved substantially correspondingly to the curvature of the jaws. However, the jaws 9 as they merge from adjacent the transverse part 22 extend partially beyond the sides 26 of the bag holding frame. whereby as the jaws separate to admit of the stem of the olive thereby, they will abut or contact with the sides 26 of the bag holding frame, consequently limiting said jaws in their separations. The sides 26 of the bag holding frame adjacent the diverging sides of the entrance mouth, also diverge substantially correspondingly to the diversion of the parts 15. The diverging portions 27 of the sides 26 are bent at 28 to form the parallel parts 29, which are in turn bent at 30 and 31 to form the shanks 32 which are received in the socket 3 of the handle. The portions 33 between the bends 30 and 31 of the bag holding frame are in parallelism with the parts 20 and engage the transverse groove 2 of the handle, thereby securing the bag holding frame and insuring rigidity for the anchoring connection of said frame. A suitable wire 34 is extended transversely of the handle 1 and its socket 3 and between the shanks 19 and 32, and the end portions 35 of said wire 34 extend toward and are wrapped about the parallel adjacent portions 20 and 33 of the two frames, as shown at 36, thereby preventing displacement of the shanks 19 and 32 axially from the socket 3. The olive or fruit holding bag is of the general shape shown and is stitched on the opposite sides of its frame, and to the portions 25 which are just beyond the bends 23 of the loop 21. By the provision of the opposite sides of the bag holding frame, it is to be noted that an opening corresponding to the space between the jaws $9^a$ but a trifle larger in fact wider is provided, to permit of the passage of the olives into the bag as the stems pass between the jaws $9^a$.

The invention having been set forth what is claimed as new and useful is:—

In an olive gatherer, a bag supporting frame constructed from a single length of spring wire, bent upon itself to form a loop and provided with opposing curved sides, said sides having shanks, to engage a handle, a pair of spring jaws, constructed from a single length of spring wire, bent upon itself to form an angular loop, said angular loop having a portion passing through the loop of the bag holding frame; said jaws between the angular loop substantially conforming to and passing between the sides of the bag holding frame, said jaws terminating in shanks and a handle having a socket to receive the shanks of the frame and the jaws, and a bag carried by said frame.

In testimony whereof I have signed my name to this specification in the presence of two subscribing witnesses.

CONSTANT L. DUHEM.

Witnesses:
 R. G. STAPLETON,
 W. W. GINGLE.

Copies of this patent may be obtained for five cents each, by addressing the "Commissioner of Patents, Washington, D. C."